United States Patent [19]

Ulrickson

[11] Patent Number: 4,607,963

[45] Date of Patent: Aug. 26, 1986

[54] MULTI-CHANNEL INFRARED THERMOMETER

[75] Inventor: Michael A. Ulrickson, East Windsor, N.J.

[73] Assignee: The United States of America as represented by the United States Department of Energy, Washington, D.C.

[21] Appl. No.: 473,179

[22] Filed: Mar. 8, 1983

[51] Int. Cl.[4] .......................... G01J 5/62; G01N 21/00
[52] U.S. Cl. ..................................... 374/131; 374/121; 374/137
[58] Field of Search ............... 374/121, 124, 126, 130, 374/131, 137; 250/342, 338, 227; 356/43, 44, 45

[56] References Cited

U.S. PATENT DOCUMENTS

| | | | |
|---|---|---|---|
| 3,584,509 | 6/1971 | Gaylord et al. | 374/131 |
| 3,922,550 | 11/1975 | Crowley et al. | 350/339 |
| 3,967,289 | 6/1976 | Yevick | 350/96.25 |
| 4,061,578 | 12/1977 | Kleinerman | 374/124 |
| 4,075,493 | 2/1978 | Wickersheim | 374/131 |
| 4,083,223 | 4/1978 | Hashimoto et al. | 374/124 |
| 4,142,207 | 2/1979 | McCormack et al. | 358/113 |
| 4,262,198 | 4/1981 | Gupta et al. | 250/227 |
| 4,326,798 | 4/1982 | Kahn | 356/43 |
| 4,367,040 | 1/1983 | Goto | 374/131 |
| 4,376,890 | 3/1983 | Engström et al. | 374/131 |
| 4,427,881 | 1/1984 | Ruell | 250/227 |
| 4,448,547 | 5/1984 | Wickersheim | 374/131 |

Primary Examiner—Charles Frankfort
Assistant Examiner—W. Morris Worth
Attorney, Agent, or Firm—Jeannette M. Walder; Michael J. Higgins; Judson R. Hightower

[57] ABSTRACT

A device for measuring the two-dimensional temperature profile of a surface comprises imaging optics for generating an image of the light radiating from the surface; an infrared detector array having a plurality of detectors; and a light pipe array positioned between the imaging optics and the detector array for sampling, transmitting, and distributing the image over the detector surfaces. The light pipe array includes one light pipe for each detector in the detector array.

3 Claims, 4 Drawing Figures

MULTI-CHANNEL INFRARED THERMOMETER

CONTRACTUAL ORIGIN OF THE INVENTION

The U.S. Government has rights in this invention pursuant to Contract No. DE-AC02-76-CH03073 between the U.S. Department of Energy and Princeton University.

BACKGROUND OF THE INVENTION

This invention relates generally to the field of infrared temperature measurements; and, more particularly to an improved infrared thermometer having a shortened response time.

In the area of nuclear fusion, assessment of the performance of a tokamak limiter depends strongly on the thermal loads the plasma deposits on the limiter during a discharge. The best method for determining the thermal load is to measure the limiter surface temperature during a pulse. Present commercial systems which give two-dimensional information are limited either to the TV framing rate (30/sec) giving a 16 ms response time or to devices using mechanical scanning by mirrors giving a 30 ms response time. Line scanning or point systems have response times of 40 $\mu$s to 100 $\mu$s, but are inadequate for very non-symmetrical temperature profiles, such as on tokamak limiters. Since the two-dimensional temperature profile of the limiter surface provides very useful information about the edge properties of the plasma (e.g., scrape-off thickness and edge transport coefficients), it is desirable to obtain this information with as great a temporal resolution as possible.

Infrared radiation is a convenient non-contact means for measuring surface temperature. If the infrared emissivity of an object is independent of wavelength in the region of interest, then the true temperature of the object can be determined solely from the ratio of the radiance at two different wavelengths. This is the theoretical basis for two color pyrometry.

Since the tokamak limiter surface is usually TiC or C and emissivity is nearly constant with wavelength for these materials over the wavelength bands chosen for an infrared thermometer, two color pyrometry may be used.

Therefore, it is an object of the present invention to provide a two-dimensional infrared thermometer having a shortened response time.

Additional objects, advantages and novel features of the invention will be set forth in part in the description which follows, and in part will become apparent to those skilled in the art upon examination of the following or may be learned by practice of the invention.

SUMMARY OF THE INVENTION

To achieve the foregoing and in accordance with the purpose of the present invention, a device for measuring the two-dimensional temperature profile of a surface may comprise imaging optics for generating an image of the light radiating from the surface; an infrared detector array having a plurality of detectors; and optical means positioned between said imaging optics and said infrared detector array for sampling, transmitting, and distributing said image over the detector surfaces. The optical means may be a light pipe array having one light pipe for each detector in the detector array.

A single detector receiving the image measures one spot in the field of view, which is the same as a point system measurement. A single detector large enough to receive the entire image (or conversely an image formed small enough to cover the detector) measures only the average temperature of the surface. Consequently, in order to give two-dimensional measurements, an array of detectors is used. Generally, detector arrays are arranged in rows and columns with a 2×2 array being the mathematically smallest possible. Asymmetrical configurations are also possible. However, if the temperature distribution is unknown, a regular array is the most suitable. The greater the number of detectors in the array, the more spacial information is determined.

Due to the size limitations on individual infrared detectors in the array, the detectors cannot be placed close enough together to receive enough of the image to give a meaningful temperature profile. An array of light pipes (or other optical transmission means) permits the image to be divided into a number of sections and each section to be transmitted directly and uniformly over each detector. In this way the spacing of the detectors does not result in the loss of a portion of the image.

DESCRIPTION OF THE DRAWINGS

The present invention is illustrated in the accompanying drawings wherein.

DESCRIPTION OF A PREFERRED EMBODIMENT

Figure 1:
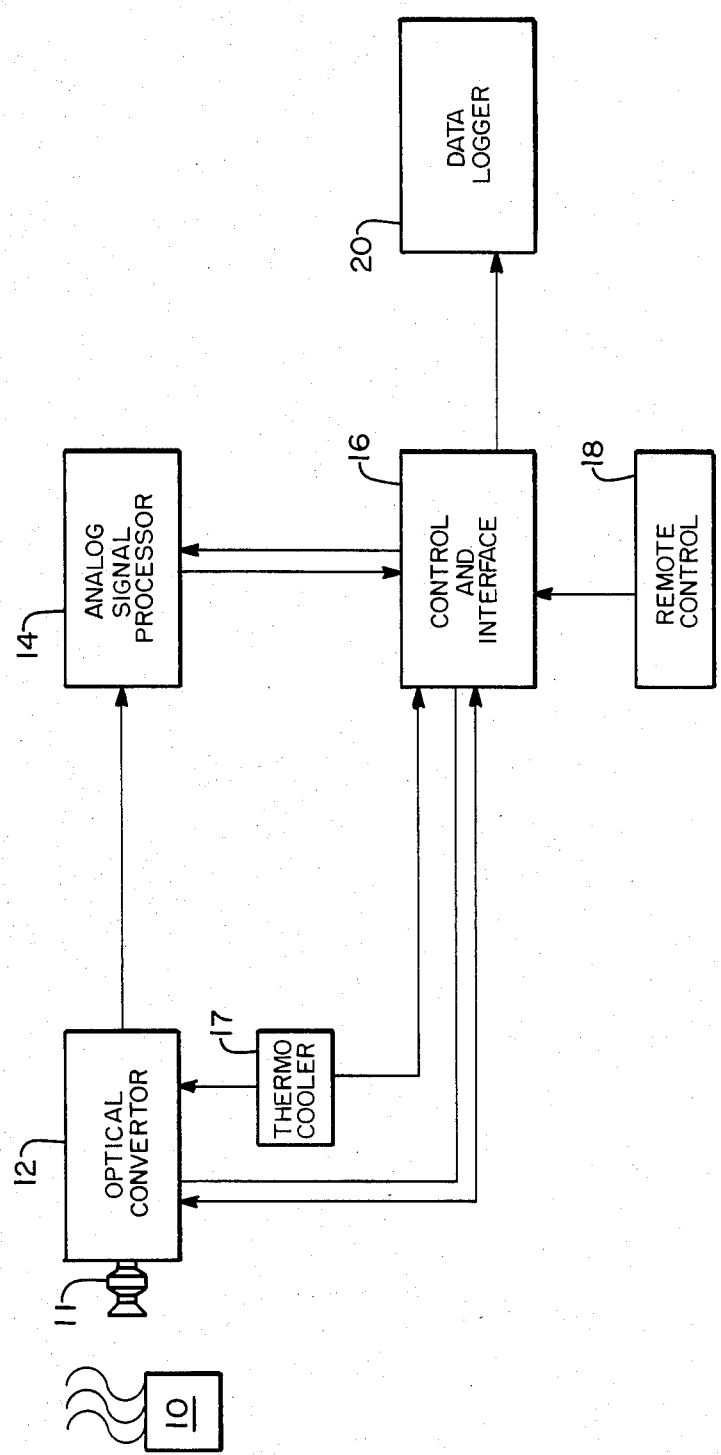
FIG. 1 is a block diagram of a multichannel infrared detector system and electronics.

Referring to FIG. 1, light from infrared radiation source 10 is received by lens 11 connected to optical converter 12. Optical converter 12 converts infrared radiation into analog signals which are processed by analog signal processor 14, which are fed through control and interface 16 into data logger 20 where they are digitized for display. Control and interface 16 permits selection by remote control 18 of wavelength and temperature range and generates the emissivity signal. Thermo cooler 17 maintains the detectors at constant temperature.

Figure 2:
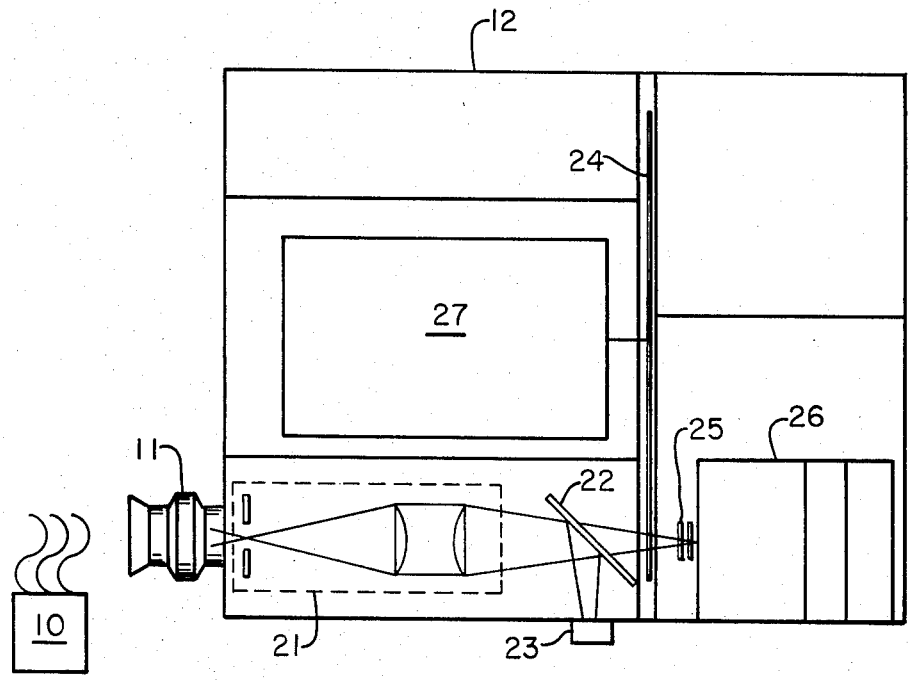
FIG. 2 is a schematic of the optical converter 12 in FIG. 1.

Referring to FIG. 2, light from infrared source 10 enters lens 11 and is imaged by imaging optics 21. Since there is generally a need to be able to aim the instrument using visible light optics, this is accomplished by placing dichroic mirror 22 in the path of the image. Visible light is then reflected to eye piece 23 and infrared radiation is transmitted for detection. The infrared image passes through optical chopper 24, which is used to increase the signal to noise ratio in the 100° C. to 300° C. temperature range. Optical chopper 24 is driven by motor 27. The chopped signal then passes through wavelength filters and attenuator 25, which can be remotely selected. The attenuator is necessary to prevent saturation of the detectors at source temperatures in excess of 1500° C. The image is then received by detector assembly 26 which generates analog signals which vary as a function of the incident radiant energy.

Figure 3:
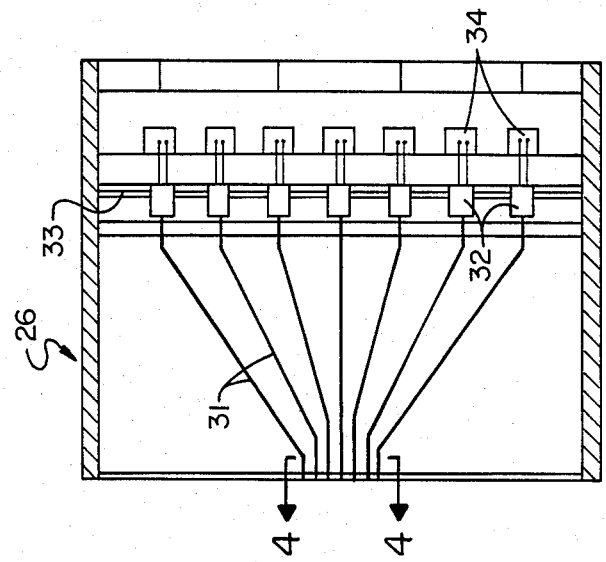
FIG. 3 is a cross-section of the detector assembly 26 shown in FIG. 2.
Figure 4:
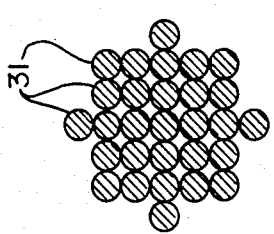
FIG. 4 is a section along line 4—4 of FIG. 3.

Referring to FIGS. 3 and 4, imaged infrared radiation enters the light pipe array consisting of light pipes 31. For the tokamak limiter, the light pipe and detector arrays are arranged 5×5 with four additional on the axes for a total of 29. Each light pipe 31 samples a portion of the image and transmits and uniformly distributes it over each detector 32. The light pipe ends in the image plane are placed very close together (as shown in FIG. 4) in order to receive the entire image. The detectors are attached to a thermoelectrically cooled plate 33 which is maintained at a constant temperature. Detectors 32 generate signals which are coupled to analog signal processor 14 (shown in FIG. 1) through leads (not shown) which connect at slots 34.

When the thermometer is used on a tokamak, radiation damage induced by the neutron flux restricts the choice of optical materials. The most stable optical material has been found to be fused quartz with crown and flint glass also being acceptable. The light pipes consist of quartz rods which are bent to the desired shape by heating to their softening point on a graphite mold. The choice of these materials limits the longest useable wavelength to $\leq 3$ $\mu$m. The temperature range of interest is 100° C. to 3600° C. The 100° C. lower limit dictates the choice of detector, which leads to the use of PbS detectors having a maximum responsivity between 2.0 and 2.5 $\mu$m. The wide temperature range requires that the input signal cover a dynamic range of just over 6 orders of magnitude. This results in the use of three temperature ranges which are realized through combination of amplifier gain, optical attenuation and analog to digital converter dynamic range. The three temperature ranges are 300° C. (covers 100° C. to 400° C.), 2000° C. (covers 300° C. to 2000° C.), and 3000° C. (covers 1700° C. to about 3600° C.). Based on the response curves for PbS detectors, available filters and position of atmospheric absorption bands, the wavelength bands chosen were $\lambda_1 = 1.288$ $\mu$m (bandwidth 0.234 $\mu$m) and $\lambda_2 = 2.284$ $\mu$m (bandwidth 0.47 $\mu$m). The time response of the instrument was measured using a step function input having a rise time $<10$ $\mu$s. With this input, the output was observed to have a rise time (10% to 90%) of 7 ms with a corresponding e-folding time of 3.5 ms.

In this disclosure, there is shown and described only the preferred embodiments of the invention, but it is to be understood that the invention is capable of use in other combinations.

The embodiments of this invention in which an exclusive property or privilege is claimed are defined as follows:

1. A device for measuring the two-dimensional temperature profile of a surface comprising:

imaging optics for generating an image of light radiating from the surface, said image including an infrared radiation portion and a visible light portion;
a dichroic mirror positioned to receive said image, wherein the dichroic mirror transmits the infrared radiation portion of said image and reflects the visible light portion of said image;
visible optics aiming means positioned to receive said reflected visible light portion of said image;
an optical chopper positioned to receive said transmitted infrared radiation portion of said image for modulating the intensity of said transmitted infrared image;
a selectable bandpass filter positioned to receive said modulated image;
a two dimensional infrared detector array having a plurality of detectors;
a light pipe array having one light pipe for each detector in said two dimensional detector array and positioned between said filter and said detector array wherein the light pipes of the light pipe array each simultaneously sample, transmit, and distribute a selected separate portion of said filtered image over the surface of its respective detector; and
multi-channel circuit means coupled to said two-dimensional detector array operative in response to signals generated by the detectors for providing electrical signals indicative of the two-dimensional temperature profile of the surface.

2. The device of claim 1 wherein said surface is the surface of a Tokamak limiter, said infrared detectors are comprised of PbS and said light pipes are comprised of quartz rods.

3. A device for measuring the two-dimensional temperature profile of a surface comprising:

imaging optics for generating an image of the light radiating from the surface;
a two dimensional infrared detector array having a plurality of detectors;
a light pipe array having one light pipe for each detector in said two dimensional detector array, positioned between said imaging optics and the detector array, wherein the light pipes of said light pipe array each simultaneously sample, transmit, and distribute a selected separate portion of said image over the surface of its respective detector; and
means coupled to said two-dimenisional detector array operative in response to signals generated by the detectors for providing electrical signals indicative of the two dimensional temperature profile of the surface.

* * * * *